(12) United States Patent
Issa et al.

(10) Patent No.: US 8,116,732 B2
(45) Date of Patent: Feb. 14, 2012

(54) ROUTING MOBILE USERS TO SECURE LOCATIONS BASED ON TRANSACTION TYPE

(75) Inventors: Alfredo C. Issa, Apex, NC (US); Richard J. Walsh, Raleigh, NC (US)

(73) Assignee: Oto Technologies, LLC, Raleigh, NC (US)

( * ) Notice: Subject to any disclaimer, the term of this patent is extended or adjusted under 35 U.S.C. 154(b) by 384 days.

(21) Appl. No.: 12/535,874

(22) Filed: Aug. 5, 2009

(65) Prior Publication Data

US 2011/0034147 A1    Feb. 10, 2011

(51) Int. Cl.
    *H04M 1/66* (2006.01)
(52) U.S. Cl. ............... 455/410; 455/411; 455/456.3; 455/414.3; 455/408
(58) Field of Classification Search .......... 455/410–411, 455/414.1–414.3, 456.1–457, 405–408
    See application file for complete search history.

(56) References Cited

U.S. PATENT DOCUMENTS

| | | | | |
|---|---|---|---|---|
| 5,903,831 | A * | 5/1999 | Foti | 455/410 |
| 6,314,519 | B1 * | 11/2001 | Davis et al. | 726/4 |
| 6,594,483 | B2 * | 7/2003 | Nykanen et al. | 455/411 |
| 7,333,798 | B2 * | 2/2008 | Hodge | 455/411 |
| 7,630,721 | B2 * | 12/2009 | Ortiz | 455/456.1 |
| 7,657,489 | B2 * | 2/2010 | Stambaugh | 705/72 |
| 8,014,755 | B2 * | 9/2011 | Sun et al. | 455/406 |
| 8,019,354 | B2 * | 9/2011 | Rae et al. | 455/456.1 |
| 2006/0133338 | A1 | 6/2006 | Reznik et al. | |
| 2008/0068130 | A1 | 3/2008 | Batta et al. | |
| 2008/0318547 | A1 * | 12/2008 | Ballou et al. | 455/410 |
| 2009/0030778 | A1 | 1/2009 | Zapata et al. | |
| 2010/0048167 | A1 * | 2/2010 | Chow et al. | 455/410 |
| 2010/0082486 | A1 * | 4/2010 | Lee | 705/44 |
| 2010/0306099 | A1 * | 12/2010 | Hirson et al. | 705/38 |

FOREIGN PATENT DOCUMENTS

EP    1993240 A1 *    11/2008

OTHER PUBLICATIONS nveils Secure Mobile Payments at Merchant POS, Online Publication.*
Tatli, Emin, Islam, "Security in Context-Aware Mobile business Applications," Mar. 6, 2009, Doctoral Thesis, University of Mannheim.
"Transaction Protector FAQ," Trend Micro Incorporated, accessed online May 1, 2009 from http://www.trendsecure.com/online_docs/docloader.php?DOCID=TS-TGP&DOCTAB=FAQ&DOCVER=TS3&DOCLOCALE=en-US.

* cited by examiner

*Primary Examiner* — Sharad Rampuria
(74) *Attorney, Agent, or Firm* — Withrow & Terranova, PLLC (57) ABSTRACT

Systems and methods are disclosed for routing mobile users to safe, or secure, locations. In one embodiment, based on threat information obtained from one or more source, a threat level is determined for a location of a user of a mobile device. The threat level is indicative of physical safety and/or network safety at the location of the user of the mobile device. The threat level may be a function of a transaction type of a transaction being performed or desired to be performed by the user of the mobile device. If the location is unsafe, a safe location is identified, and the user of the mobile device is routed to the safe location.

21 Claims, 9 Drawing Sheets

ROUTING MOBILE USERS TO SECURE LOCATIONS BASED ON TRANSACTION TYPE

FIELD OF THE DISCLOSURE

The present disclosure relates to routing a mobile user to a safe location for a desired transaction type.

BACKGROUND

Mobile devices, such as mobile smart phones, have become prolific in today's digital society. Further, people are using their mobile devices to conduct all types of transactions from personal banking to e-mail. One issue with mobile devices is that users do not always know if they are in a safe environment when conducting transactions. As such, there is a need for a system and method for ensuring that a user is in a safe environment before conducting a transaction on a mobile device.

SUMMARY

Systems and methods are disclosed for routing mobile users to safe, or secure, locations. In one embodiment, based on threat information obtained from one or more sources, a threat level is determined for a location of a user of a mobile device. The threat level is indicative of physical safety and/or network safety at the location of the user of the mobile device. The threat level may be a function of a transaction type of a transaction being performed or desired to be performed by the user of the mobile device. If the location is unsafe, a safe location is identified, and the user of the mobile device is routed to the safe location.

Those skilled in the art will appreciate the scope of the present invention and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawings, those skilled in the art will understand the concepts of the invention and will recognize applications of these concepts not particularly addressed herein. It should be understood that these concepts and applications fall within the scope of the disclosure and the accompanying claims.

Figure 1:
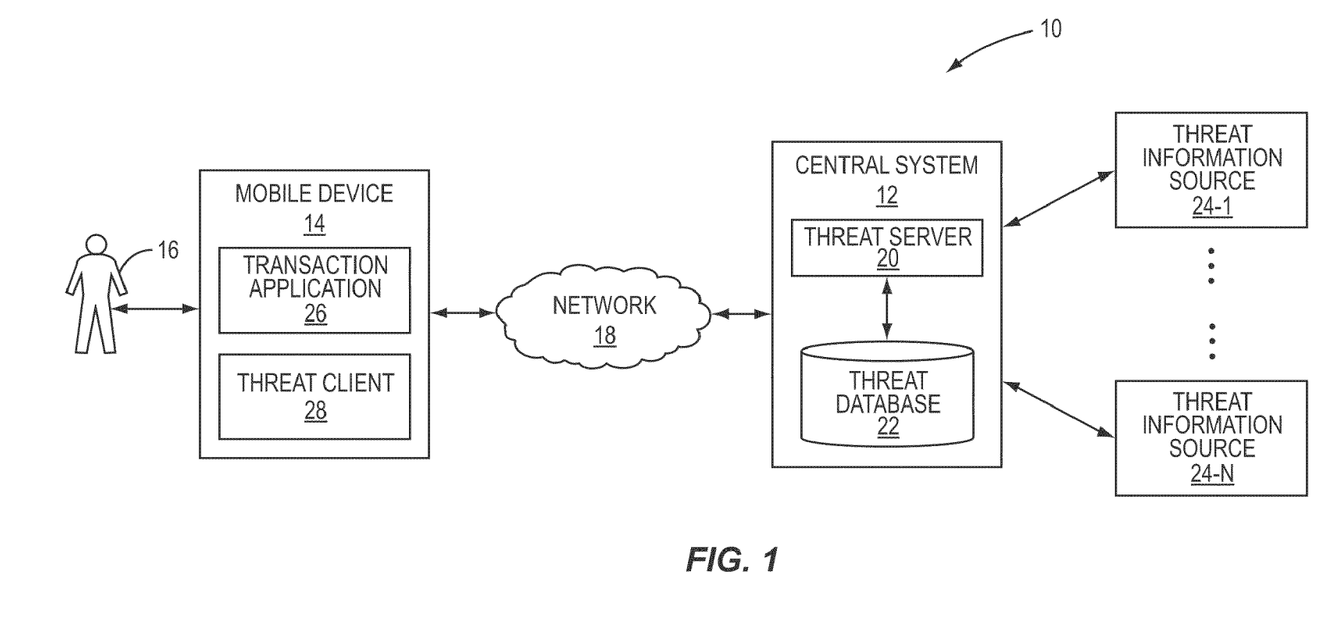
FIG. 1 illustrates a system for determining a threat level for a location of a mobile user and, if the mobile user is in an unsafe location, routing the mobile user to a safe location according to one embodiment of the present disclosure.

FIG. 1 illustrates a system 10 for routing a mobile user to a safe, or secure, location for a transaction according to one embodiment of the present disclosure. As illustrated, the system 10 includes a central system 12 communicatively coupled to a mobile device 14 having an associated user 16 via a network 18. The network 18 may be any type of Local Area Network (LAN), Wide Area Network (WAN), or the like, or any combination thereof. In addition, the network 18 may include wired and/or wireless components. In one embodiment, the network 18 is a distributed, public network, such as the Internet.

The central system 12 is a physical system. In the preferred embodiment, the central system 12 is implemented as a physical server or a number of physical servers operating in a collaborative manner for redundancy and/or load sharing. Note that, in an alternative embodiment, the functionality of the central system 12 may be distributed among one or more mobile devices 14 operating in a peer-to-peer network. As illustrated, the central system 12 hosts a threat server 20 and a threat database 22. The threat server 20 is preferably implemented in software, but may be implemented in software, hardware, or a combination thereof. As discussed below in detail, the threat server 20 operates to obtain threat information from one or more threat information sources 24-1 through 24-N and store the threat information in the threat database 22 according to location. Thus, for each of a number of known locations, the threat database 22 stores threat information for that known location. The known locations are expressed as known geographic locations, known network locations, or both. The threat information obtained from the threat information sources 24-1 through 24-N and stored in the threat database 22 is generally any type of information indicative of a physical safety or network safety at a location. However, as will be appreciated by one of ordinary skill in the art upon reading this disclosure, the specifics of the threat information may vary depending on the types of threat information sources 24-1 through 24-N from which the threat information is obtained.

In one embodiment, the threat information sources 24-1 through 24-N include one or more of the following: mobile devices such as the mobile device 14, mobile operators such as operators of mobile telecommunications networks, Internet Service Providers (ISPs), Internet services, law enforcement, commerce services, or the like. More specifically, mobile devices, such as the mobile device 14, may record threat information such as hack attempts and/or intrusions detected at the mobile devices and corresponding locations at which the hack attempts and/or intrusions occurred. The time and/or date of these events may also be recorded as part of the threat information. In addition or alternatively, mobile devices may record threat information manually input by their users. For example, a user of a mobile device may provide input to the mobile device indicating that a particular geographic location is well lit, has heavy foot traffic, or the like. In addition or alternatively, a user may apply an appropriate safety level (e.g., safe, moderately safe, or unsafe) to a particular location and optionally for an identified transaction type. The mobile devices report this threat information to the threat server 20 either automatically or upon request. Alternatively, this threat information may be reported to a mobile operator (e.g., a mobile telecommunications service provider), where the mobile operator provides this threat information to the threat server 20 automatically or upon request.

Mobile operators may store information such as hack attempts, intrusion activities, or other illegal electronic activities. These activities are recorded with respect to the geographic locations, cellular communications tower, and/or femtocell at which the activities occurred. In addition, the time and/or date of these activities may be recorded. The mobile operator reports this threat information to the threat server 20 automatically or upon request. Similarly, ISPs may record threat information such as malicious activity and corresponding geographic locations and/or access points at which those activities occurred. In addition, the time and/or date of these activities may be recorded. The ISPs may report this threat information to the threat server 20 automatically or upon request.

One or more Internet services may operate to collect and aggregate information identifying malicious activities and geographic locations and/or access points at which malicious activities have occurred. In addition, the time and/or date of these activities may be recorded. The Internet services may collect this information from, for example, ISPs, network administers or operators, or the like. The Internet services may provide this threat information to the threat server 20 automatically or upon request. Similarly, commerce services may collect and report threat information to the threat server 20. The commerce services may be electronic commerce (e-commerce) services, brick-and-mortar commerce service such as retail locations, or both. For example, an e-commerce service such as Amazon.com may record fraudulent credit card usages and the locations at which those fraudulent credit card usages occurred. In addition, the time and/or date of these activities may be recorded. As another example, a physical retail location may provide Wi-Fi access to patrons and record hack attempts and/or intrusions at that physical retail location. Again, the time and/or date of these activities may be recorded. The commerce services report this threat information to the threat server 20 automatically or upon request.

Lastly, law enforcement agencies record criminal activities and the geographic locations at which the criminal activities occurred. These law enforcement agencies may report the criminal activities and the geographic locations at which the criminal activities occurred or just the geographic locations at which the criminal activities occurred to the threat server 20 automatically or upon request. It should be noted that the types of threat information, and therefore threat information sources, described above are exemplary and are not intended to limit the scope of this disclosure. Other types of threat information and corresponding threat information sources will be apparent to one of ordinary skill in the art upon reading this disclosure and are to be considered within the scope of this disclosure. For example, the threat information may additionally or alternatively include demographic information, home values, distance from designated safe spots such as police stations, or the like.

In addition to obtaining the threat information from the threat information sources 24-1 through 24-N, the threat server 20 operates to receive and process threat requests from mobile devices, such as the mobile device 14. As discussed below in detail, in one embodiment, upon receiving a threat request from the mobile device 14, the threat server 20 determines a threat level for a desired transaction type for the location of the user 16 based on the threat information stored in the threat database 22 and returns the threat level to the mobile device 14. Still further, if desired, the threat server 20 routes the user 16 of the mobile device 14 to a safe location.

The mobile device 14 includes a transaction application 26 and a threat client 28. The transaction application 26 is preferably implemented in software, but may be implemented in software, hardware, or a combination thereof. The transaction application 26 is generally any type of application used to perform a transaction over the network 18 or via local communication (e.g., a WiFi, Bluetooth, or infrared communication link) or used by the user 16 to identify a desired type of transaction desired to be performed. Some exemplary transaction types are mobile or personal banking, e-commerce, social network updates, voice communication, text messaging, e-mail, and digital media consumption. For example, the transaction application 26 may be an Internet browser, where a transaction type to be completed by the transaction application 26 may be a personal banking transaction to be completed via the Internet browser. As another example, the transaction application 26 may be an e-mail or messaging application where a transaction type is based on a type of content to be communicated via the e-mail or messaging application. For instance, the transaction type for a message communicating confidential or private data such as a social security number or credit card number is preferably different than the transaction type for a message communicating a general message such as "How are you doing?" As a final example, the transaction application 26 may enable the user 16 to enter a desired type of manual transaction to be performed such as, for instance, obtaining money from an Automatic Teller Machine (ATM).

The threat client 28 is preferably implemented in software, but may be implemented in software, hardware, or a combination thereof. Further, while illustrated separately in this exemplary embodiment, the transaction application 26 and the threat client 28 may alternatively be implemented as a single application or component. As discussed below in detail, in one embodiment, upon initiation by the transaction application 26, the threat client 28 sends a threat request to the threat server 20. In response, the threat client 28 receives a threat level and, if needed, a route to a safe location to perform a desired transaction.

Figure 2:
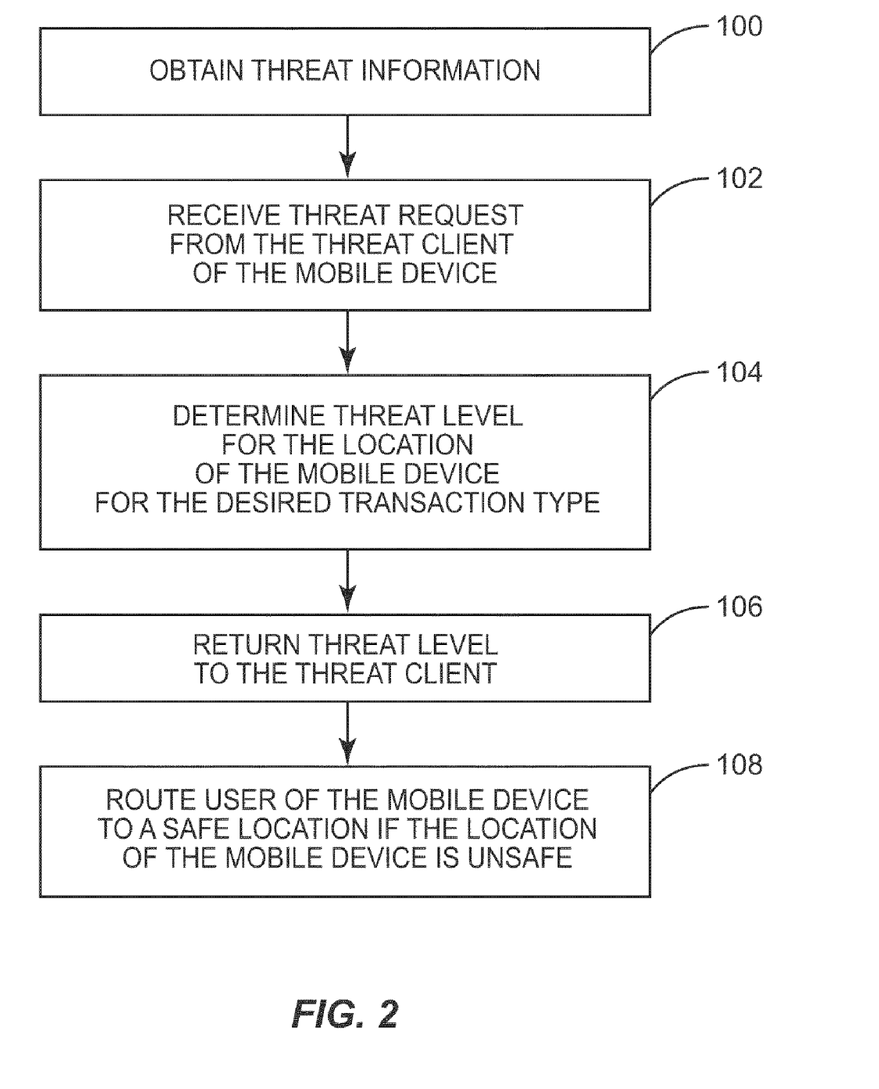
FIG. 2 is a flow chart illustrating the operation of the system of FIG. 1 according to one embodiment of the present disclosure.

FIG. 2 is a flow chart illustrating the operation of the threat server 20 of FIG. 1 according to one embodiment of the present disclosure. First, the threat server 20 obtains the threat information from the threat information sources 24-1 through 24-N for a number of known locations (step 100). The known locations are expressed as geographic locations such as latitude and longitude coordinates, street addresses, zip codes, or the like, expressed network locations such as access point identifiers, or both. Exemplary access point identifiers include, but are not limited to, Media Access Control (MAC) addresses of the access points, Internet Protocol (IP) addresses of the access points, Service Set Identifiers (SSIDs) or other similar network identifiers provided by the access points, or the like. Preferably, the threat information is dynamic such that threat server 20 obtains updates for the threat information over time. As discussed above, the threat information is stored in the threat database 22. At some point in time, the threat server 20 receives a threat request from the threat client 28 of the mobile device 14 (step 102). Preferably, the threat request identifies a transaction type of a transaction desired to be performed or expected to be performed and a location of the user 16 of the mobile device 14. The location of the user 16 of the mobile device 14 is expressed as a geographic location such as latitude and longitude coordinates, a street address, a zip code, or the like, expressed as one or more network locations such as one or more access point identifiers of access points accessible to the mobile device 14 of the user 16, or both.

In response to the threat request, the threat server 20 uses the threat information stored in the threat database 22 for the location of the user 16 of the mobile device 14 to determine a threat level for the transaction type (step 104). The threat level is indicative of a physical safety of the location of the user 16 of the mobile device 14 and/or a network safety of the location of the user 16 of the mobile device 14. For example, the physical safety of the location of the user 16 of the mobile device 14 may be a function of the desired type of transaction along with crime rate and/or types of crimes committed at or near the location of the user 16 of the mobile device 14, information regarding users of mobile devices located near the user 16 of the mobile device 14, demographic information, distance from a designated safe spot such as a police station, information regarding the physical safety of the location submitted by other users, date, time of day, or the like, or any combination thereof. The network safety may be a function of, for example, the transaction type as well as the number of and type of malicious network activities occurring at or near the location of the user 16 of the mobile device 14 such as the number of hack attempts or intrusions on mobile devices while at or near the location of the user 16 of the mobile device 14, the number and type of malicious network activities occurring on the access points accessible to the mobile device 14 of the user 16, or the like, or any combination thereof. Note that the manner in which the threat level is determined may vary depending on the types of threat information obtained by the threat server 20. Further, additional system-defined or user-defined criteria may be used. For example, the user 16 may indicate that only threat information within a defined time period (e.g., the last 30 days, after 7 pm, or the like) is to be used when determining the threat level. As another example, the user 16 may configure the types of events and/or activities to be included or excluded when determining threat levels for the user 16. For instance, the user 16 may wish to exclude shop-lifting events and/or include murder and rape events. This may be particularly beneficial because, for example, different users may have different concepts of what types of events are or are not threatening.

In this embodiment, the threat server 20 then returns the threat level to the threat client 28 of the mobile device 14 (step 106). The threat level may be expressed as either approval or denial for the desired transaction type or a rating on a scale which represents the threat associated with the desired transaction type at the location of the user 16. For example, the threat level determined in step 104 may be safe, moderate, or unsafe, and this threat level is returned to the threat client 28 of the mobile device 14.

In addition, if the threat server 20 determines that the user 16 of the mobile device 14 is in an unsafe location for the desired transaction type, the threat server 20 routes the user 16 of the mobile device 14 to a safe location for the desired transaction type (step 108). More specifically, based on the threat information stored in the threat database 22, the threat server 20 identifies one or more safe locations for the desired transaction type to which the user 16 of the mobile device 14 can be routed. The one or more safe locations are locations having low or minimal threat levels and that are near the current location of the user 16 of the mobile device 14.

In one embodiment, when identifying the one or more safe locations, the threat server 20 may also consider context. For example, the threat server 20 may determine whether the user 16 is walking or riding in an automobile. If the user 16 is riding in an automobile, the threat server 20 may search a larger area surrounding the user 16 for safe locations than if the user 16 were walking. As another example of the use of context, the threat server 20 may also consider characteristics of the current location of the user 16 when identifying the one or more safe locations such that the user 16 is routed to a safe location that is similar to the current location at which the user 16 is located. For example, if the user 16 is currently at a fast-food restaurant (e.g., McDonald's), the threat server 20 may attempt to identify other nearby fast-food restaurants having low threat levels as safe locations to which the user 16 can be routed. Other characteristics of the current location of the user 16 that may be considered by the threat server 20 include demographics or other information regarding other users that are located near the user 16, landmarks that are located near the user 16, Internet access type at the location of the user 16, or the like Once the threat server 20 identifies the one or more safe locations to which the user 16 can be routed for the desired transaction type, the manner in which the user 16 is routed to one of the safe locations varies depending on the particular implementation. While discussed in detail below, in general, either the threat server 20 or the user 16 selects one of the safe locations, and the user 16 is then routed to the selected safe location. The user 16 may be routed to the safe location using text-based directions, map-based directions, or a combination thereof. It should be noted that when generating the route to the safe location, the threat server 20 may route the user 16 such that unsafe locations are avoided, or at least substantially avoided, if possible.

Figure 3:
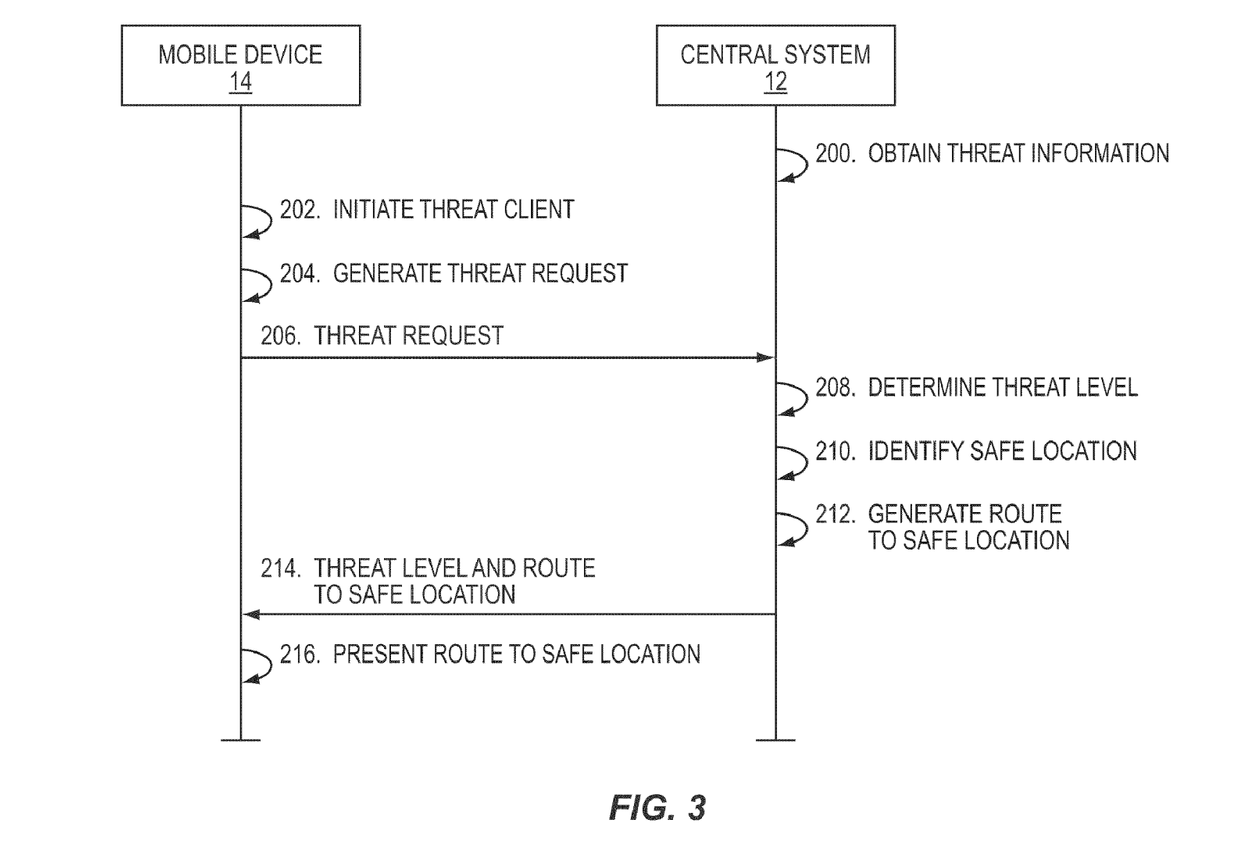
FIG. 3 is a more detailed illustration of the operation of the system of FIG. 1 according to a first embodiment of the present disclosure.

FIG. 3 is a more detailed illustration of the operation of the system 10 of FIG. 1 according to one embodiment of the present disclosure. First, as described above, the threat server 20 of the central system 12 obtains threat information from the one or more threat information sources 24-1 through 24-N (step 200). Next, the threat client 28 is initiated at the mobile device 14 (step 202). More specifically, in one embodiment, when the user 16 desires to perform a transaction via the transaction application 26, the transaction application 26 initiates the threat client 28. In response, the threat client 28 generates a threat request (step 204). As discussed above, the threat request preferably identifies a desired transaction type and a location of the user 16 of the mobile device 14. The threat client 28 then sends the threat request from the mobile device 14 to the central system 12 (step 206).

Upon receiving the threat request, the central system 12, and more particularly the threat server 20, determines a threat level for the location of the user 16 of the mobile device 14 for the desired transaction type (step 208). More specifically, as discussed above, using the threat information obtained for the location of the user 16, the threat server 20 determines a threat level that is indicative of physical safety and/or network safety for the location of the user 16 for the desired transaction type.

In this example, the threat level for the location of the user 16 indicates that the location of the user 16 is unsafe for the desired transaction type. As such, the threat server 20 of the central system 12 also operates to identify a safe location for the desired transaction type to which the user 16 of the mobile device 14 can be routed (step 210). As described above, the safe location may be identified using the threat information for other locations that are near the location of the user 16 and, optionally, context. Once the safe location is identified, the threat server 20 generates a route from the location of the user 16 to the safe location identified by the threat server 20 at which the user 16 can safely perform a transaction of the desired transaction type (step 212). The threat server 20 may generate the route using an internal routing algorithm or by accessing a third-party routing service such as Google Maps via associated Application Programming Interfaces (APIs) or the like. In one embodiment, the route is generated such that the user 16 is routed to avoid, or at least substantially avoid, unsafe locations, if possible.

In this embodiment, once the route is generated, the threat server 20 of the central system 12 sends the threat level and the route to the safe location to the mobile device 14 (step 214). The threat level may be expressed as either approval or denial for the desired transaction type or a rating on a scale which represents the threat associated with the desired transaction type at the location of the user 16. The threat level may be used to automatically allow or prevent the transaction from occurring or may be presented to the user 16 such that the user 16 is enabled to choose whether to proceed with the transaction. The route to the safe location may be text-based directions to the safe location, map-based directions to the safe location, or a combination thereof. The threat client 28 presents the route to the safe location to the user 16 at the mobile device 14 (step 216).

Note that FIG. 3 illustrates an embodiment where the threat server 20 generates the route internally or by accessing a third-party service. However, in an alternative embodiment, the threat server 20 may provide information identifying the safe location to the mobile device 14 (e.g., a street address of the safe location, Global Positioning System (GPS) coordinates of the safe location, or the like). The threat client 28 may then use an internal routing algorithm to generate the route to the safe location, use a separate routing or mapping application on the mobile device 14 to generate the route to the safe location, or access a web-based routing or mapping service via an Internet connection to obtain the route to the safe location. If the threat server 20 desires to route the user 16 to avoid, or at least substantially avoid, unsafe locations, in addition to providing the information identifying the safe location to the mobile device 14, the threat server 20 may also provide one or more intermediate locations corresponding to safe or moderately safe locations through which the user 16 is to be routed to get to the safe location to the mobile device 14, one or more unsafe locations to avoid, or both.

Figure 4:
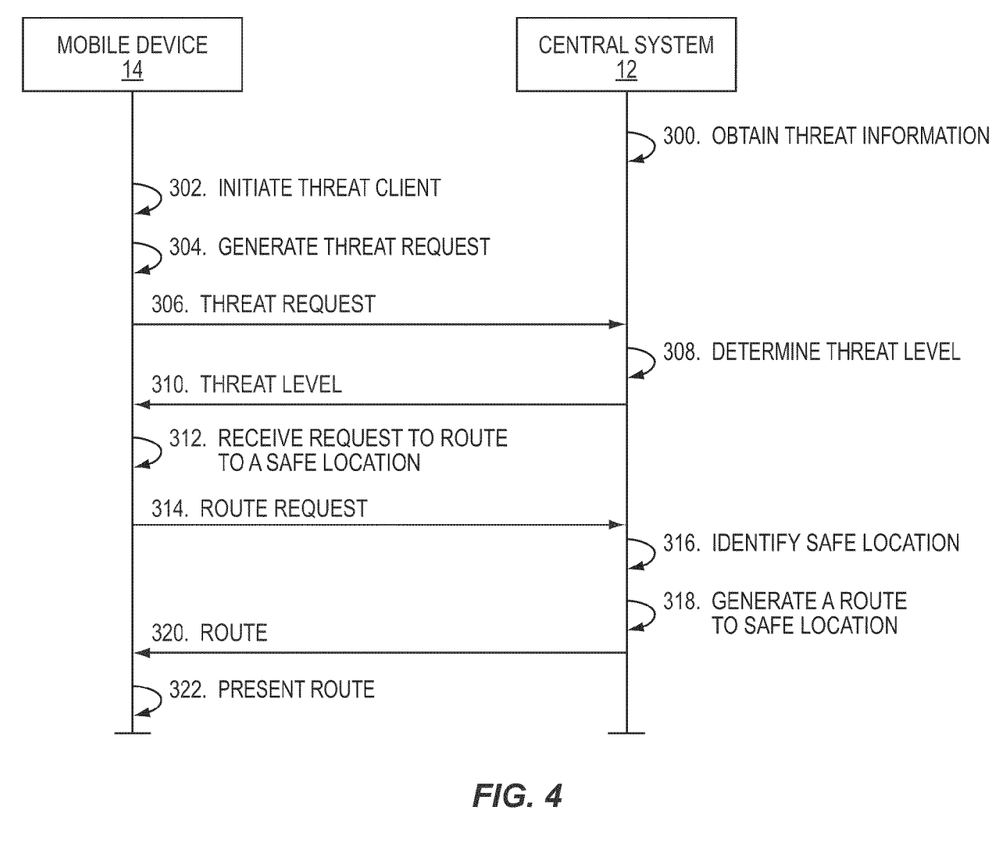
FIG. 4 is a more detailed illustration of the operation of the system of FIG. 1 according to a second embodiment of the present disclosure.

FIG. 4 is a more detailed illustration of the operation of the system 10 of FIG. 1 according to another embodiment of the present disclosure. First, as described above, the threat server 20 of the central system 12 obtains threat information from the one or more threat information sources 24-1 through 24-N (step 300). Next, the threat client 28 is initiated at the mobile device 14 (step 302). More specifically, in one embodiment, when the user 16 desires to perform a transaction via the transaction application 26, the transaction application 26 initiates the threat client 28. In response, the threat client 28 generates a threat request (step 304). As discussed above, the threat request preferably identifies a desired transaction type and a location of the user 16 of the mobile device 14. The threat client 28 then sends the threat request from the mobile device 14 to the central system 12 (step 306).

Upon receiving the threat request, the central system 12, and more particularly the threat server 20, determines a threat level for the location of the user 16 of the mobile device 14 for the desired transaction type (step 308). More specifically, as discussed above, using the threat information obtained for the location of the user 16, the threat server 20 determines a threat level that is indicative of physical safety and/or network safety for the location of the user 16 for the desired transaction type.

In this embodiment, the threat server 20 then sends the threat level from the central system 12 to the mobile device 14 (step 310). The threat level may be expressed as either approval or denial for the desired transaction type or a rating on a scale which represents the threat associated with the desired transaction type at the location of the user 16. The threat level may be used by the threat client 28 to automatically allow or prevent the transaction from occurring or may be presented to the user 16 such that the user 16 is enabled to choose whether to proceed with the transaction.

In this example, the threat level indicates that the location of the user 16 is unsafe for the desired transaction type, and the threat client 28 receives a request from the user 16 to be routed to a safe location for the desired transaction type (step 312). In response, the threat client 28 sends a route request to the central system 12 (step 314). Upon receiving the route request, the threat server 20 of the central system 12 identifies a safe location to which the user 16 can be routed to perform the desired transaction type (step 316). As described above, the safe location may be identified using the threat information for other locations that are near the location of the user 16 and, optionally, context. Once the safe location is identified, the threat server 20 generates a route from the location of the user 16 to the safe location identified by the threat server 20 at which the user 16 can safely perform a transaction of the desired transaction type and returns the route to the mobile device 14 (steps 318 and 320). The threat server 20 may generate the route using an internal routing algorithm or by accessing a third-party routing service such as Google Maps via associated APIs or the like. In one embodiment, the route is generated such that the user 16 is routed to avoid, or at least substantially avoid, unsafe locations, if possible. The route to the safe location may be text-based directions to the safe location, map-based directions to the safe location, or a combination thereof. The threat client 28 presents the route to the safe location to the user 16 at the mobile device 14 (step 322).

Note that FIG. 4 illustrates an embodiment where the threat server 20 generates the route internally or by accessing a third-party service. However, in an alternative embodiment, the threat server 20 may provide information identifying the safe location to the mobile device 14 (e.g., a street address of the safe location, GPS coordinates of the safe location, or the like). The threat client 28 may then use an internal routing algorithm to generate the route to the safe location, use a separate routing or mapping application on the mobile device 14 to generate the route to the safe location, or access a web-based routing or mapping service via an Internet connection to obtain the route to the safe location. If the threat server 20 desires to route the user 16 to avoid, or at least substantially avoid, unsafe locations, in addition to providing the information identifying the safe location to the mobile device 14, the threat server 20 may also provide one or more intermediate locations corresponding to safe or moderately safe locations through which the user 16 is to be routed to get to the safe location to the mobile device 14, one or more unsafe locations to avoid, or both.

Figure 5:
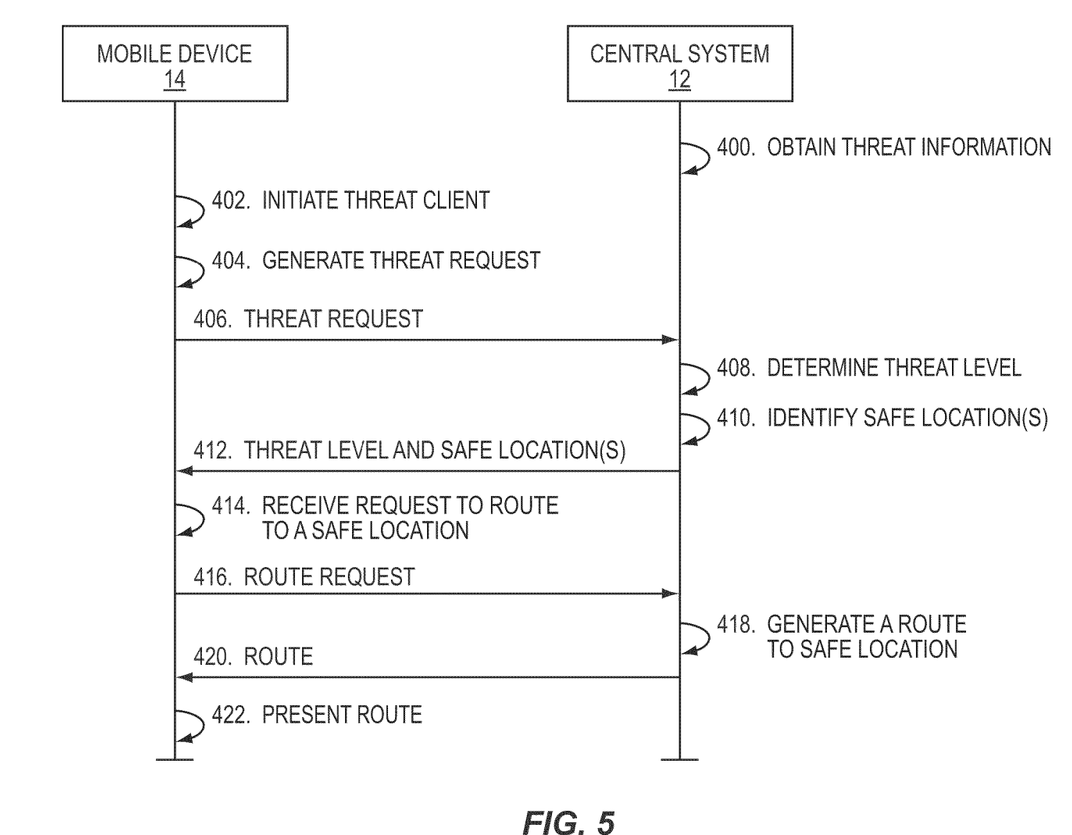
FIG. 5 is a more detailed illustration of the operation of the system of FIG. 1 according to a third embodiment of the present disclosure.

FIG. 5 is a more detailed illustration of the operation of the system 10 of FIG. 1 according to another embodiment of the present disclosure. First, as described above, the threat server 20 of the central system 12 obtains threat information from the one or more threat information sources 24-1 through 24-N (step 400). Next, the threat client 28 is initiated at the mobile device 14 (step 402). More specifically, in one embodiment, when the user 16 desires to perform a transaction via the transaction application 26, the transaction application 26 initiates the threat client 28. In response, the threat client 28 generates a threat request (step 404). As discussed above, the threat request preferably identifies a desired transaction type and a location of the user 16 of the mobile device 14. The threat client 28 then sends the threat request from the mobile device 14 to the central system 12 (step 406).

Upon receiving the threat request, the central system 12, and more particularly the threat server 20, determines a threat level for the location of the user 16 of the mobile device 14 for the desired transaction type (step 408). More specifically, as discussed above, using the threat information obtained for the location of the user 16, the threat server 20 determines a threat level that is indicative of physical safety and/or network safety for the location of the user 16 for the desired transaction type. In addition, in this example, the threat level indicates that the location of the user 16 is unsafe for the desired transaction type. As such, in this embodiment, the threat server 20 identifies one or more safe locations for the desired transaction type to which the user 16 can be routed (step 410). As described above, the one or more safe locations may be identified using the threat information for other locations that are near the location of the user 16 and, optionally, context.

The threat server 20 then sends the threat level and information identifying the one or more safe locations to the mobile device 14 (step 412). The threat level may be expressed as either approval or denial for the desired transaction type or a rating on a scale which represents the threat associated with the desired transaction type at the location of the user 16. The threat level may be used by the threat client 28 to automatically allow or prevent the transaction from occurring or may be presented to the user 16 such that the user 16 is enabled to choose whether to proceed with the transaction. The information identifying the one or more safe locations may be, for example, a list of the one or more safe locations, a map illustrating the one or more safe locations, or the like.

In this example, the threat level indicates that the location of the user 16 is unsafe for the desired transaction type, and the threat client 28 receives a request from the user 16 to be routed to one of the safe locations identified by the threat server 20 and selected by the user 16 (step 414). In response, the threat client 28 sends a route request to the central system 12 (step 416). Upon receiving the route request, the threat server 20 of the central system 12 generates a route from the location of the user 16 to the safe location selected by the user 16 and returns the route to the mobile device 14 (steps 418 and 420). The threat server 20 may generate the route using an internal routing algorithm or by accessing a third-party routing service such as Google Maps via associated APIs or the like. In one embodiment, the route is generated such that the user 16 is routed to avoid, or at least substantially avoid, unsafe locations, if possible. The route to the safe location may be text-based directions to the safe location, map-based directions to the safe location, or a combination thereof. The threat client 28 presents the route to the safe location to the user 16 at the mobile device 14 (step 422).

Again, note that FIG. 5 illustrates an embodiment where the threat server 20 generates the route internally or by accessing a third-party service. However, in an alternative embodiment, the threat server 20 may provide information identifying the safe location to the mobile device 14 (e.g., a street address of the safe location, GPS coordinates of the safe location, or the like). The threat client 28 may then use an internal routing algorithm to generate the route to the safe location, use a separate routing or mapping application on the mobile device 14 to generate the route to the safe location, or access a web-based routing or mapping service via an Internet connection to obtain the route to the safe location. If the threat server 20 desires to route the user 16 to avoid, or at least substantially avoid, unsafe locations, in addition to providing the information identifying the safe location to the mobile device 14, the threat server 20 may also provide one or more intermediate locations corresponding to safe or moderately safe locations through which the user 16 is to be routed to get to the safe location to the mobile device 14, one or more unsafe locations to avoid, or both.

Figure 6:
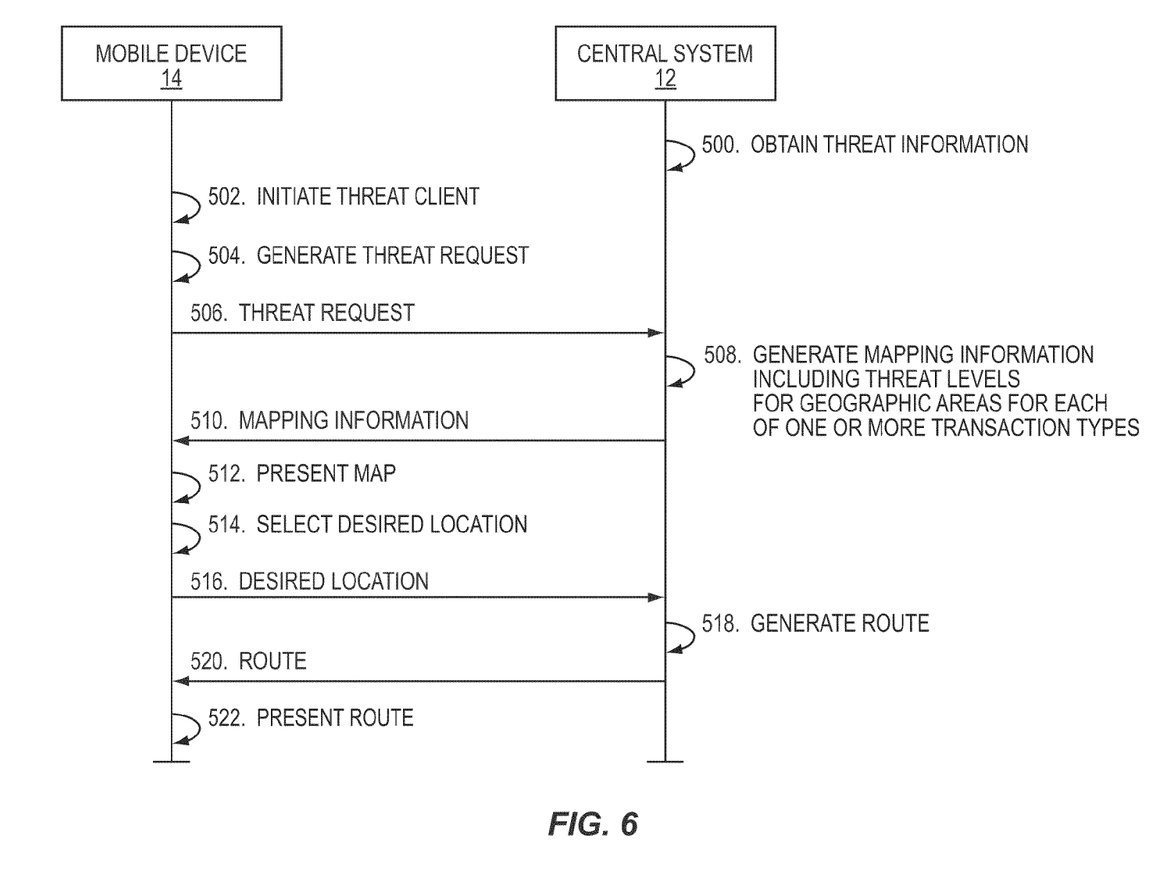
FIG. 6 illustrates the operation of the system of FIG. 1 according to another embodiment of the present disclosure.

FIG. 6 illustrates the operation of the system 10 of FIG. 1 according to another embodiment of the present disclosure. This embodiment is different from those described above in that threat levels for a number of geographic areas and transaction types are presented to the user 16 proactively. First, as described above, the threat server 20 of the central system 12 obtains threat information from the one or more threat information sources 24-1 through 24-N (step 500). Next, the threat client 28 is initiated at the mobile device 14 (step 502). More specifically, in this embodiment, the threat client 28 is initiated proactively, rather than reactively. For instance, the user 16 may initiate the threat client 28 before initiating a particular transaction. In response, the threat client 28 generates a threat request (step 504). In this embodiment, the threat request identifies a location of the user 16 of the mobile device 14. In this embodiment, the threat request preferably does not identify a desired transaction type. However, in an alternative embodiment, the threat request may identify one or more transaction types of interest. The threat client 28 then sends the threat request from the mobile device 14 to the central system 12 (step 506).

Upon receiving the threat request, the central system 12, and more particularly the threat server 20, generates mapping information including threat levels for a number of geographic areas for each of a number of transaction types (step 508). More specifically, for each transaction type, using the threat information in the threat database 22, the threat server 20 determines a threat level for a sufficient number of locations surrounding the location of the user 16 to generate mapping information illustrating geographic areas and the corresponding threat levels for those geographic areas for the transaction type. Note that the geographic areas may be different for each transaction type.

In one embodiment, the mapping information generated by the threat server 20 is a map, such as an interactive map, showing threat levels for geographic areas for each of a number of transaction types. In one alternative embodiment, the mapping information is information to be utilized by the mobile device 14 to generate a map, such as an interactive map, showing threat levels for geographic areas for each of a number of transaction types. For example, the mapping information may include information defining an overall map area (e.g., the city of Chicago), information defining a number of geographic areas within the map area for each transaction type, and information defining or otherwise representing the threat levels of the geographic areas within the map area for each transaction type. The transaction types represented in the map may be all transaction types or one or more transaction types of interest identified in the threat request.

Once the mapping information is generated, the threat server 20 sends the mapping information to the mobile device

14 (step 510). The threat client 28 of the mobile device 14 then presents the map showing the geographic areas and their corresponding threat levels for each of the number of transaction types to the user 16 at the mobile device 14 (step 512). In the embodiment where the mapping information is the map, the threat client 28 presents the mapping information to the user 16. In the embodiment where the mapping information is the information to be used to generate the map, the threat client 28 may use an internal mapping component to generate and present the map using the mapping information, provide the mapping information to a separate mapping application on the mobile device 14 for generation and presentation of the map, or use the mapping information in conjunction with a web-based mapping service to obtain and present the map.

In this embodiment, the threat client 28 enables the user 16 to select a desired location, which is preferably a desired location that is safe for a transaction type desired to be performed by the user 16, from the map (step 514). In response, the threat client 28 sends the desired location from the mobile device 14 to the central system 12 as a route request (step 516). The threat server 20 of the central system 12 then generates a route from the location of the user 16 to the desired location selected by the user 16 and returns the route to the mobile device 14 (steps 518 and 520). The threat server 20 may generate the route using an internal routing algorithm or by accessing a third-party routing service such as Google Maps via associated APIs or the like. In one embodiment, the route is generated such that the user 16 is routed to avoid, or at least substantially avoid, unsafe locations, if possible. The route to the desired location may be text-based directions to the desired location, map-based directions to the desired location, or a combination thereof. The threat client 28 presents the route to the desired location to the user 16 at the mobile device 14 (step 522).

Again, note that FIG. 6 illustrates an embodiment where the threat server 20 generates the route internally or by accessing a third-party service. However, in an alternative embodiment, the threat client 28 may then use an internal routing algorithm to generate the route to the desired location, use a separate routing or mapping application on the mobile device 14 to generate the route to the desired location, or access a web-based routing or mapping service via an Internet connection to obtain the route to the desired location. If the threat server 20 desires to route the user 16 to avoid, or at least substantially avoid, unsafe locations, the threat server 20 may provide one or more intermediate locations corresponding to safe or moderately safe locations through which the user 16 is to be routed to get to the desired location to the mobile device 14, one or more unsafe locations to avoid, or both.

In the embodiment above, the user 16 selects a desired location to which the user 16 desires to be routed. In one alternative embodiment, the user 16 may select a desired safe geographic area for a desired transaction type. The user 16 may then be routed to a safe location within the selected geographic area such as, for example, a nearest safe location in the selected geographic area, a safe location in the selected geographic area having characteristics similar to those of the current location of the user 16 or satisfying one or more criteria defined by the user 16, or the like.

Figure 7:
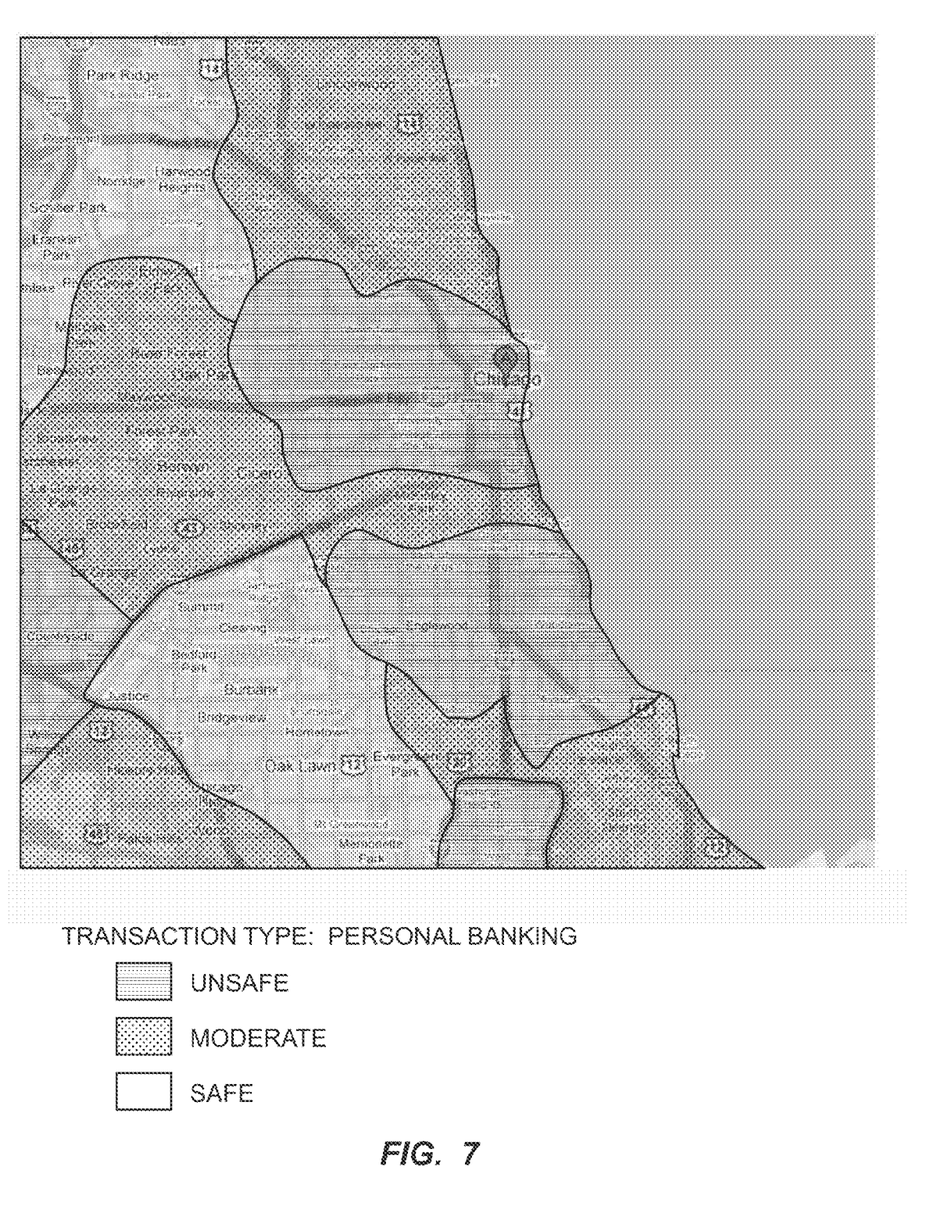
FIG. 7 is an exemplary map generated using the process of FIG. 6 according to one embodiment of the present disclosure.

FIG. 7 is an exemplary map generated according to the process of FIG. 6 that illustrates threat levels for a number of geographic areas for a transaction type according to one embodiment of the present disclosure. In this example, the map is of the city of Chicago. Based on the threat information stored in the threat database 22 for locations within the city of Chicago, the threat server 20 has divided Chicago into a number of geographic areas each having a corresponding threat level for a "Personal Banking" transaction type. In this example, the threat levels are "Safe," "Moderate," and "Unsafe." However, these threat levels are exemplary and are not intended to limit the scope of the present disclosure. In this example, if the user 16 desires to perform a "Personal Banking" transaction, the user 16 can select a desired location within one of the "Safe" geographic areas on the map and then be routed to that desired location. Alternatively, the user 16 can select one of the "Safe" geographic areas on the map and be routed to a safe location within the selected geographic area. Note that the map may be dynamic in that the geographic areas and their threat levels may be updated as new threat information is obtained.

Figure 8:
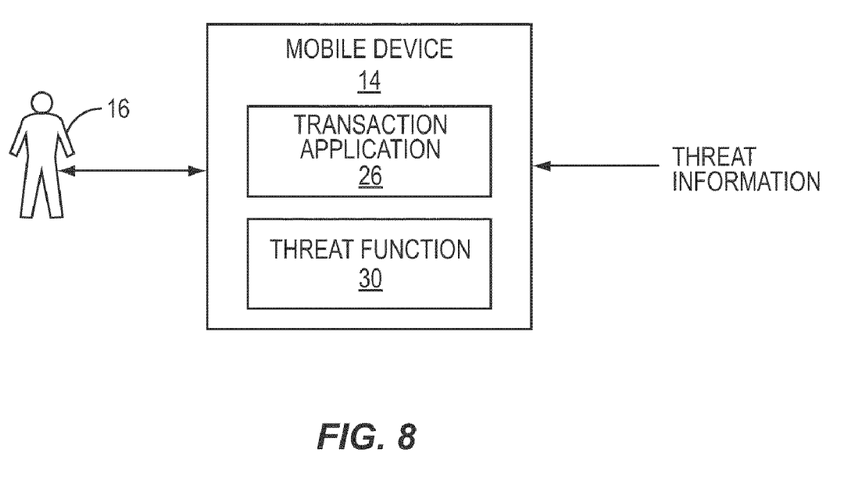
FIG. 8 illustrates the mobile device according to an alternative embodiment of the present disclosure.

Thus far, the description has focused on the embodiment illustrated in FIG. 1 wherein the threat server 20 is hosted by a central system 12. FIG. 8 illustrates another embodiment wherein the mobile device 14 includes a threat function 30, rather than the threat client 28. The threat function 30 is preferably implemented in software, but may be implemented in software, hardware, or a combination thereof. In general, the threat function 30 operates to perform most, if not all, of the functions of the threat server 20 and the threat client 28 described above. More specifically, the threat function 30 obtains threat information from one or more threat information sources (not shown) such as, for example, nearby mobile devices, one or more mobile operators, one or more ISPs, law enforcement, one or more commerce services, or the like, or any combination thereof. Alternatively, the central system 12 (FIG. 1) may obtain threat information in the manner described above and push all threat information or threat information relevant to the mobile device 14 to the mobile device 14. The threat information relevant to the mobile device 14 may be threat information regarding the current location of the user 16 of the mobile device 14, threat information regarding one or more anticipated locations of the user 16 of the mobile device, or both. In addition, particularly for routing to safe locations, the threat information relevant to the mobile device 14 may include threat information for locations near to or surrounding the current location and/or anticipated locations of the user 16 of the mobile device 14.

Based on the threat information, in a manner similar to that described above with respect to FIGS. 2-5, the threat function 30 is enabled to determine threat levels for desired transaction types at the current location or anticipated locations of the user 16 of the mobile device 14 and route the user 16 to a safe location if desired. In addition or alternatively, in a manner similar to that described above with respect to FIGS. 6 and 7, the threat function 30 may generate a map illustrating threat levels for a number of geographic areas for each of a number of transaction types and, if desired, route the user 16 to a safe location to perform a desired transaction.

Figure 9:
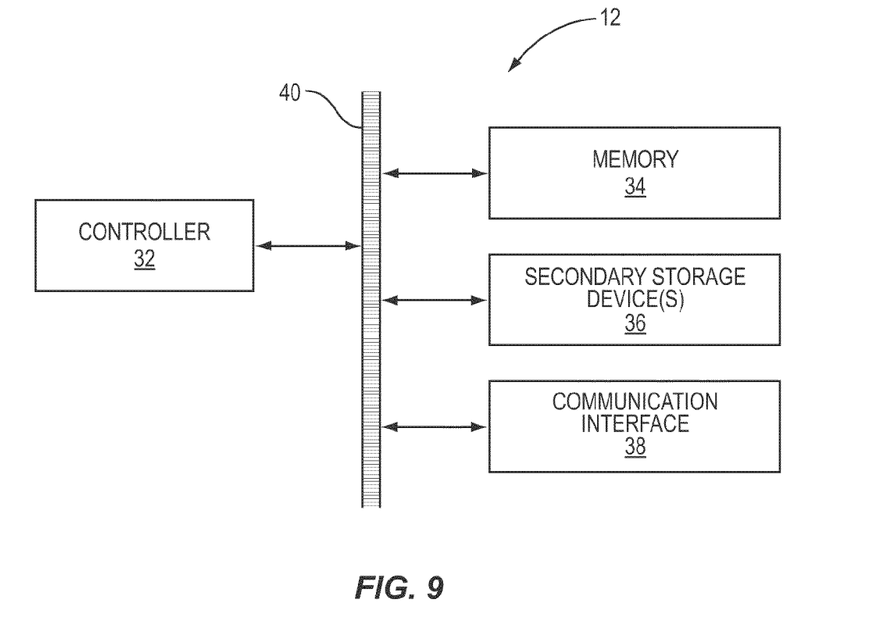
FIG. 9 is a block diagram of the central system of FIG. 1 according to one embodiment of the present disclosure.

FIG. 9 is a block diagram of the central system 12 of FIG. 1 according to one embodiment of the present disclosure. As illustrated, the central system 12 includes a controller 32 connected to memory 34, one or more secondary storage devices 36, and a communication interface 38 by a bus 40 or similar mechanism. The controller 32 is a microprocessor, digital Application Specific Integrated Circuit (ASIC), Field Programmable Gate Array (FPGA), or the like. In this embodiment, the controller 32 is a microprocessor, and the threat server 20 (FIG. 1) is implemented in software and stored in the memory 34 for execution by the controller 32. Further, in this embodiment, the threat database 22 is implemented in the one or more secondary storage devices 36, which are digital data storage devices such as, for example, one or more hard disk drives. The communication interface 38 is a wired or wireless communication interface that communicatively couples the central system 12 to the network 18 (FIG. 1). For example, the communication interface 38 may be an Ethernet interface, local wireless interface such as a wireless interface operating according to one of the suite of IEEE 802.11 standards, or the like.

Figure 10:
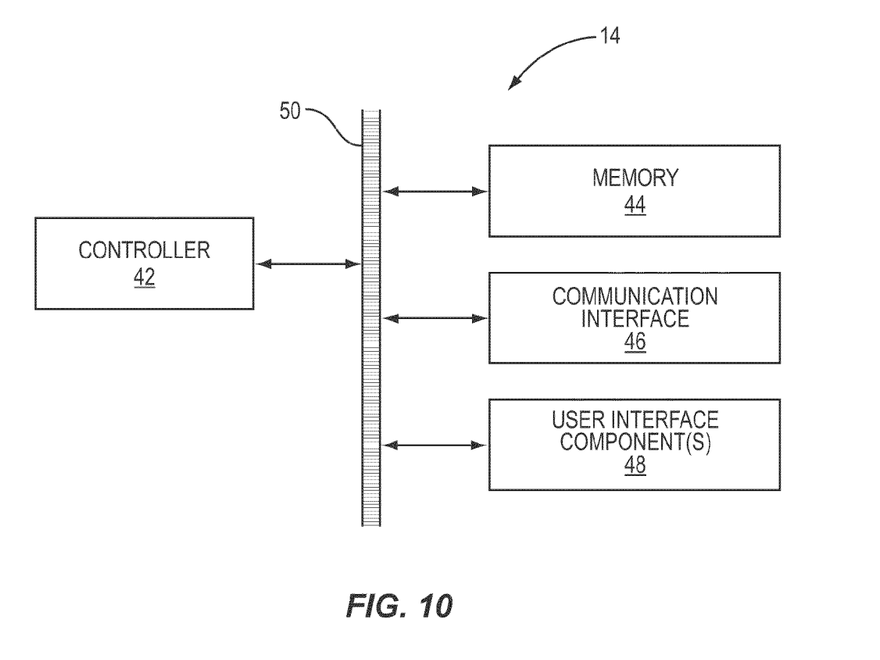
FIG. 10 is a block diagram of the mobile device of FIGS. 1 and 8 according to one embodiment of the present disclosure.

FIG. 10 is a block diagram of the mobile device 14 of FIGS. 1 and 8 according to one embodiment of the present disclosure. As illustrated, the mobile device 14 includes a controller 42 connected to memory 44, a communication interface 46, and one or more user interface components 48 by a bus 50 or similar mechanism. The controller 42 is a microprocessor, digital ASIC, FPGA, or the like. In this embodiment, the controller 42 is a microprocessor, and either the threat client 28 (FIG. 1) or the threat function 30 (FIG. 8) is implemented in software and stored in the memory 44 for execution by the controller 42. The communication interface 46 is a mobile communications interface such as a cellular telecommunications interface, a local wireless communication interface (e.g., IEEE 802.11x interface), or the like. The one or more user interface components 48 include, for example, a touchscreen, a display, one or more user input components (e.g., a keypad), a speaker, or the like, or any combination thereof.

Those skilled in the art will recognize improvements and modifications to the embodiments of the present invention. All such improvements and modifications are considered within the scope of the concepts disclosed herein and the claims that follow.

What is claimed is:

1. A method of operation of a central system comprising:
obtaining threat information for a plurality of locations;
receiving a threat request from a mobile device of a user, the threat request identifying a desired transaction type, wherein the desired transaction type relates to a financial transaction;
determining a threat level indicative of at least one of a physical safety of a location of the user of the mobile device for the desired transaction type and a network safety of the location of the user of the mobile device for the desired transaction type based on the threat information for the location of the user of the mobile device;
providing the threat level to the mobile device of the user; and
routing the user of the mobile device to a safe location for the desired transaction type if the threat level indicates that the location of the user of the mobile device is unsafe for the desired transaction type.

2. The method of claim 1 wherein routing the user of the mobile device to the safe location comprises:
examining the threat information for at least a subset of the plurality of locations to identify one of the at least a subset of the plurality of locations as the safe location for the desired transaction type;
generating a route from the location of the user of the mobile device to the safe location; and
automatically providing the route to the mobile device.

3. The method of claim 1 wherein routing the user of the mobile device to the safe location comprises:
examining the threat information for at least a subset of the plurality of locations to identify one of the at least a subset of the plurality of locations as the safe location for the desired transaction type; and
automatically providing information identifying the safe location to the mobile device.

4. The method of claim 1 wherein routing the user of the mobile device to the safe location comprises:
subsequent to providing the threat level to the mobile device of the user, receiving a route request from the mobile device to route the user of the mobile device to a safe location;
in response to the route request, examining the threat information for at least a subset of the plurality of locations to identify one of the at least a subset of the plurality of locations as the safe location for the desired transaction type;
generating a route from the location of the user of the mobile device to the safe location; and
providing the route to the mobile device.

5. The method of claim 1 wherein routing the user of the mobile device to the safe location comprises:
subsequent to providing the threat level to the mobile device of the user, receiving a route request from the mobile device to route the user of the mobile device to a safe location;
in response to the route request, examining the threat information for at least a subset of the plurality of locations to identify one of the at least a subset of the plurality of locations as the safe location for the desired transaction type; and
providing information identifying the safe location to the mobile device.

6. The method of claim 1 wherein routing the user of the mobile device to the safe location comprises:
examining the threat information for at least a subset of the plurality of locations to identify one or more safe locations for the desired transaction type from the at least a subset of the plurality of locations;
providing information identifying the one or more safe locations for the desired transaction type to the mobile device;
receiving a route request from the mobile device to route the user of the mobile device to the safe location, where the safe location is selected from the one or more safe locations by the user of the mobile device;
generating a route from the location of the user of the mobile device to the safe location; and
providing the route to the mobile device.

7. The method of claim 1 wherein routing the user of the mobile device to the safe location comprises:
examining the threat information for at least a subset of the plurality of locations to identify one or more safe locations for the desired transaction type from the at least a subset of the plurality of locations; and
providing information identifying the one or more safe locations for the desired transaction type to the mobile device, wherein the mobile device enables the user to select the safe location from the one or more safe locations and is enabled to obtain a route to the safe location.

8. The method of claim 1 wherein routing the user of the mobile device to the safe location comprises routing the user of the mobile device to the safe location such that unsafe locations are at least substantially avoided.

9. The method of claim 1 wherein for each location of the plurality of locations, the threat information for the location comprises at least one of a group consisting of: information regarding hack attempts that have occurred at the location, information regarding intrusions that have occurred at the location, information regarding malicious network activities that have occurred at the location, information regarding criminal activities that have occurred at the location, information regarding persons located at or near the location, demographic information for the location, user submitted threat information for the location, and whether the location is near a designated safe spot.

10. A central system comprising:
a communication interface communicatively coupling the central system to a mobile device of a user via a network; and
a control system associated with the communication interface and adapted to:
obtain threat information for a plurality of locations;
receive a threat request from the mobile device of the user, the threat request identifying a desired transaction type, wherein the desired transaction type relates to a financial transaction;
determine a threat level indicative of at least one of a physical safety of a location of the user of the mobile device for the desired transaction type and a network safety of the location of the user of the mobile device for the desired transaction type based on the threat information for the location of the user of the mobile device;
provide the threat level to the mobile device of the user; and
route the user of the mobile device to a safe location for the desired transaction type if the threat level indicates that the location of the user of the mobile device is unsafe for the desired transaction type.

11. A method of operation of a mobile device comprising:
obtaining threat information for a plurality of locations;
determining a threat level indicative of at least one of a physical safety of a location of a user of the mobile device for a desired transaction type and a network safety of the location of the user of the mobile device for the desired transaction type based on the threat information for the location of the user of the mobile device, wherein the desir4ed transaction type relates to a financial transaction; and
routing the user of the mobile device to a safe location for the desired transaction type if the threat level indicates that the location of the user of the mobile device is unsafe for the desired transaction type.

12. The method of claim 11 wherein routing the user of the mobile device to the safe location comprises:
examining the threat information for at least a subset of the plurality of locations to identify one of the at least a subset of the plurality of locations as the safe location for the desired transaction type;
obtaining a route from the location of the user of the mobile device to the safe location; and
presenting the route to the user of the mobile device.

13. The method of claim 11 wherein routing the user of the mobile device to the safe location comprises:
presenting the threat level to the user of the mobile device;
receiving, from the user, a route request to route the user of the mobile device to a safe location;
in response to the route request, examining the threat information for at least a subset of the plurality of locations to identify one of the at least a subset of the plurality of locations as the safe location for the desired transaction type;
obtaining a route from the location of the user of the mobile device to the safe location; and
presenting the route to the user of the mobile device.

14. The method of claim 11 wherein routing the user of the mobile device to the safe location comprises:
examining the threat information for at least a subset of the plurality of locations to identify one or more safe locations for the desired transaction type from the at least a subset of the plurality of locations;
presenting information identifying the one or more safe locations for the desired transaction type to the user of the mobile device;
receiving, from the user, a route request to route the user of the mobile device to the safe location, where the safe location is selected from the one or more safe locations by the user of the mobile device;
obtaining a route from the location of the user of the mobile device to the safe location; and
presenting the route to the user of the mobile device.

15. The method of claim 11 wherein routing the user of the mobile device to the safe location comprises routing the user of the mobile device to the safe location such that unsafe locations are at least substantially avoided.

16. The method of claim 11 wherein for each location of the plurality of locations, the threat information for the location comprises at least one of a group consisting of: information regarding hack attempts that have occurred at the location, information regarding intrusions that have occurred at the location, information regarding malicious network activities that have occurred at the location, information regarding criminal activities that have occurred at the location, information regarding persons located at or near the location, demographic information for the location, user submitted threat information for the location, and whether the location is near a designated safe spot.

17. A mobile device comprising:
a communication interface; and
a control system associated with the communication interface and adapted to:
obtain threat information for a plurality of locations;
determine a threat level indicative of at least one of a physical safety of a location of a user of the mobile device for a desired transaction type and a network safety of the location of the user of the mobile device for the desired transaction type based on the threat information for the location of the user of the mobile device, wherein the desired transaction type relates to a financial transaction; and
route the user of the mobile device to a safe location for the desired transaction type if the threat level indicates that the location of the user of the mobile device is unsafe for the desired transaction type.

18. A method of operation of a central system comprising:
obtaining threat information for a plurality of locations;
receiving a threat request from a mobile device of a user, the threat request identifying a location of the user of the mobile device;
based on the threat information for the location of the user of the mobile device, generating mapping information that represents, for each transaction type of a plurality of transaction types, a threat level for each geographic area of a plurality of geographic areas for the transaction type, wherein the threat level is indicative of at least one of a physical safety of the geographic area for the transaction type and a network safety of the geographic area for the transaction type, wherein at least one of the plurality of transaction types to relate to a financial transaction; and
providing the mapping information to the mobile device.

19. The method of claim 18 further comprising:
receiving a route request to route the user of the mobile device to a safe location for a desired transaction type within one of the plurality of geographic areas for the desired transaction type; and routing the user of the mobile device to a safe location for the desired transaction type within the one of the plurality of geographic areas.

20. A method of operation of a mobile device comprising:

obtaining threat information for a plurality of locations;

based on the threat information for a location of a user of the mobile device, generating mapping information that represents, for each transaction type of a plurality of transaction types, a threat level for each geographic area of a plurality of geographic areas for the transaction type, wherein the threat level is indicative of at least one of a physical safety of the geographic area for the transaction type and a network safety of the geographic area for the transaction type, wherein at least one of the plurality of transaction types relates to a financial transaction; and presenting the mapping information to the user of the mobile device.

21. The method of claim 20 further comprising:

receiving a route request to route the user of the mobile device to a safe location for a desired transaction type within one of the plurality of geographic areas for the desired transaction type; and routing the user of the mobile device to a safe location for the desired transaction type within the one of the plurality of geographic areas.

* * * * *